United States Patent

[11] 3,622,682

[72] Inventor Vittorio Buroni
   Milan, Italy
[21] Appl. No. 71,604
[22] Filed Sept. 11, 1970
[45] Patented Nov. 23, 1971
[73] Assignee Industrie Pirelli S.p.A.
[32] Priority Sept. 18, 1969
[33] Italy
[31] 22184 A/69

[54] STOP JOINT FOR HIGH-VOLTAGE, OIL-FILLED CABLE
   14 Claims, 4 Drawing Figs.
[52] U.S. Cl. ................................................. 174/22 R,
   174/73 R
[51] Int. Cl. ............................................. H02g 15/24
[50] Field of Search ........................................... 174/22 R,
   21 R, 73 R, 735 C, 91, 92, 77 R, 88 R

[56] References Cited
   UNITED STATES PATENTS
3,061,666 10/1962 Duvall et al. .................. 174/94
2,967,901 1/1961 Priaroggia .................. 174/22 R X Primary Examiner—Darrell L. Clay
Attorney—Ward, McElhannon, Brooks, and Fitzpatrick ABSTRACT: A stop joint for joining together a pair of high-voltage oil-filled electrical power cables, and comprising a locking mechanism for securing together the ends of the cable conductors and further comprising a rigid insulator which interconnects the conductors where they are joined, to the outer casing of the cables thereby to absorb the mechanical stresses caused by heating and cooling of the conductors. The locking mechanism comprises a pair of circular discs having sleeves fitted to the respective cable conductors and circumferential protuberances about the edge of the periphery of each disc. These protuberances define a circumferential projection when the discs are together. A ring which can be dissembled is provided about the discs and the ring contains an internal groove which accommodates the projection and holds the discs together.

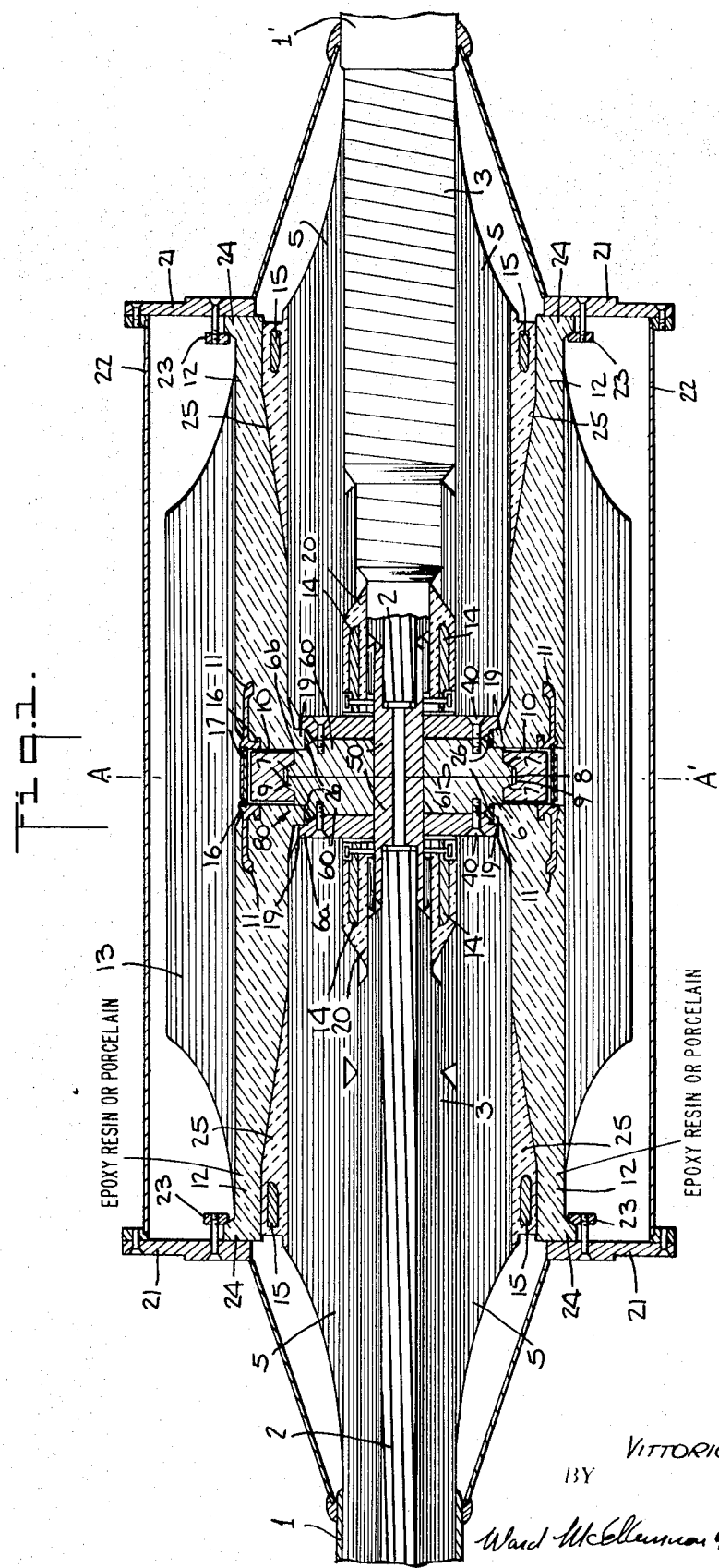

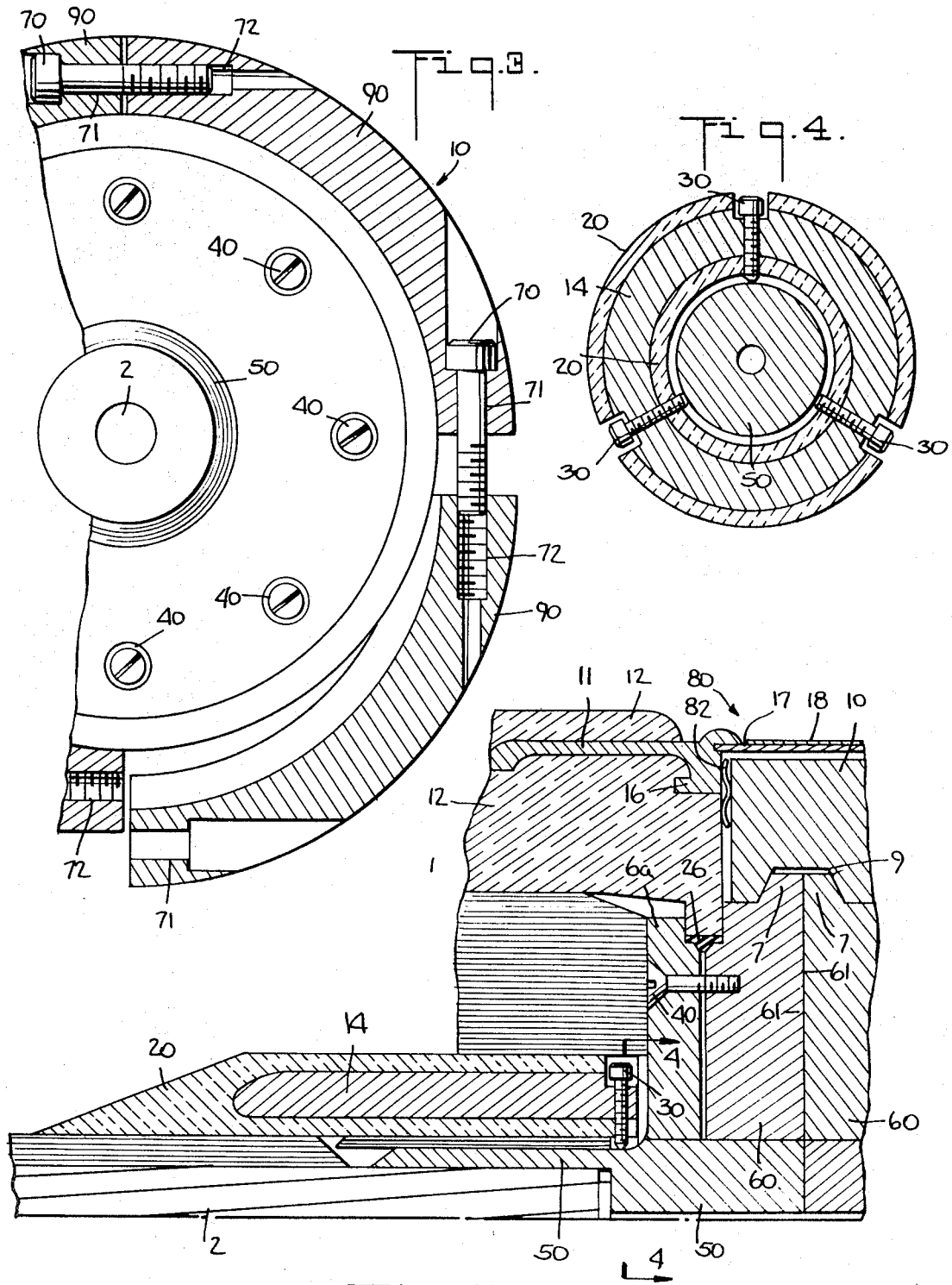

STOP JOINT FOR HIGH-VOLTAGE, OIL-FILLED CABLE

This invention relates to electrical connectors and more particularly it concerns an improved stop joint provided with locked strands to be used with high and very high voltage, oil-filled electrical power cables.

In previously used stop joints for high and very high oil-filled electrical power cables, it was difficult to achieve satisfactory locking of the cable strands. Moreover, efficient locking is very important for reasons which will be explained hereinafter.

When an electrical cable passes current it becomes heated to a temperature corresponding to the magnitude of the current and, at its rated current, the cable temperature corresponds to a maximum admissible temperature for the particular type of cable. The cable, consequently, tends to elongate, Moreover, this elongation concentrates at individual connecting points of the cable, for instance at its joints. These longitudinal deformations sometimes amount to several centimeters and consequently can give rise to considerable stresses. The magnitude of these stresses is proportional to the coefficient of linear expantion of the material forming the cable conductor, to the temperature to which the conductor is subjected, and to the modulus of elasticity of the conductor.

In general, a stop joint for an electrical cable is situated in an intermediate zone, with respect to two cable lengths to be connected. While the cable becomes heated by electrical current passing therethrough, equal elongations take place at the two sides of the joint, so that each cable length is subjected to a similar compressive stress, exerted by its contiguous length. As a result, each cable length converging at the joint becomes subjected to combined bending and compression stresses.

On the other hand, a cooling of the electrical conductor of the cable may produce a shrinkage or contraction at the intermediate joint and, in such case, each cable section becomes subjected to tension. It happens that after a few cycles of such thermal expansion and contraction, the cable insulation becomes seriously impaired.

In order to eliminate these drawbacks, it has previously been proposed to absorb the stresses generated in the cable conductor with the joint supporting structure, that is by the joint casing. This prior arrangement involved a sleeve, engaged by a metallic element which locked clamping devices to which the conductor end was fastened. The connection between the metallic element and the sleeve was through a ring-nut imbedded in the latter. The ring-nut in the metallic element was provided with recesses and with a plurality of pawls encased within appropriate seats, from which they tend to displace under the action of the spring.

In using these prior cable joints, the two cable lengths are first brought together. Then the sleeve in inserted on the metallic element until the latter has reached the ring-nut. The sleeve is then rotated until the recesses of the ring-nut face the pawls of the metallic element. These pawls, when pushed outward from the spring, prevent any axial displacement of the joined cables.

The above described prior systems have proven to be unreliable in regard to the efficient and positive engagement of the ring-nut by one or more of the pawls. Actually, once the sleeve is mounted, it is not possible visually to control the various parts in contact; so that, during operation of the joint it could become subject to various undesired faults. Also, if the joint is not precisely manufactured, and if the cables become locked in an incomplete way as a result of this, they may be damaged and the joint itself could give way. This give rise to other serious technical problems, since, besides rebuilding the stop joint, it may in some cases be necessary to use an additional normal joint, which may compensate for the cable lengths removed as a consequence of their damage.

The present invention provides an improved stop joint, in which the locking of the cable length is easily controllable, and which insures, from the time of cable installation completely reliable operation.

The present invention additionally provides a joint which, in an event of a sudden irregularity, can be inspected with simple systems which do not involve serious technical difficulties. More specifically, the improved stop joint of the present invention, which provides for the locking of the strands of high and very high voltage oil-filled electrical power cables, is rigidly connected to an outer casing and is provided with an insulator constituted by two parts, equal and specularly opposite with respect to a transversal plane of symmetry of the joint. As illustratively embodied, the joint may include at least three pairs of electrodes, one pair for the two entries of the cable insulation into the joint, one pair for the two connections between the electrical contacts with their respective cable conductors and one pair for the assembly constituted by a pair of electrical contact elements. This last mentioned assembly comprises two electrical contact elements which are rigidly connected to their respective conductors. These contact elements are specularly shaped and, on assembly, they contact each other in specular alignment. The mutually contacting ends of the contacts have a diameter greater than that of their remaining parts. These mutually contacting enlarged ends have continuous edged flanges which in assembly cooperate to form an annular projection which fits into a corresponding seat in an annular ring. The ring, which circumferentially surrounds the enlarged ends of the contacts, is made up of a plurality of sectors whose relative positions can be adjusted with appropriate locking means to align and lock together the contacts and the ring. The outer surface of the ring constitutes an intermediate portion of a screening electrode assembly which assembly further comprises a pair of electrodes extending in opposite directions from the contact and ring assembly.

The invention will be better understood after reading the following detailed description of a presently preferred embodiment thereof with reference to the appended drawings, in which:

FIG. 1 is a longitudinal section view of a stop joint, with locked strands, for high and very high voltage oil-filled cables in which the present invention in embodied;

FIG. 2 is an enlarged fragmentary section view showing the details of a locking mechanism used in the electrical joint of FIG. 1;

FIG. 3 is an enlarged fragmentary section view showing the details of an annular ring locking assembly used in the electrical joint of FIG. 1; and FIG. 4 is a cross-sectional view taken along line 4—4 of FIG. 2.

Referring now to FIG. 1, two cables 1 and 1' are each shown to be made up of a central conductor 2 covered by a wrapping of paper insulation 3, tapered in steps toward the end of the conductor. Outer paper insulators 5 overlie the cable insulations to give them extra mechanical support. The paper used for the insulators should be strong and preferably covered on one side with adhesive so as to provide maximum possible compactness.

A joint assembly 80 provides both a mechanical and an electrical connection for the cables 1 and 1'. The joint assembly 80 generally consists of a pair of electrical contact elements 6. Each contact element comprises a sleeve 50, which extends over and is clamped to the end of one of the cable conductors 2, and a circular disc 60 coaxial with the sleeve and mounted on the end thereof, so that the discs 60 have mutually facing free surfaces on the sides thereof opposite the sides from which the sleeves 50 extend.

When the joint is assembled, the electrical contact elements 6 are in mechanical and electrical contact with each other at the free surfaces of the discs 60. This free surfaces are flat and are preferably polished and smooth. A plane of symmetry A—A' is defined by the contacting surfaces of the discs. A frusto conical protuberance 7 extends out from the periphery of each disc adjacent its free surface. When the free surfaces of the contact elements are brought together the respective protuberances 7 cooperate to define an annular projection 8 of trapezoidal cross-section which is specularly shaped with respect to the plane of symmetry A—A' of the joint. An annular ring 10 engages the protruberances 7 and is used to effectuate a rigid connection between them. The ring 10 lies on the plane of symmetry A—A' of the joint and extends around the circumferential exterior of the discs 60. The annular ring 10 is formed with a groove 9 about its inner circumferential surface. The groove 9 has a cross-sectional configuration similar to that of the annular projection 8 so that the groove and the projection mate intimately with one another. By adjusting the effective diameter of the ring 10, (by means to be described), intimate and secure contact between the frustoconical protruberances 7 and the groove 9 is obtained. The transverse forces created by so adjusting the ring 10, serve to bring the discs 60 into alignment and thereby lock the disc together in a manner providing good mechanical and electrical contact. By locking the contact elements 6 together in this manner, the resulting assembly provides a rigid and strong cable joint. Nevertheless, should unlocking become necessary, as for possible maintenance, the assembly may be easily disengaged by readjusting the ring 10, in a manner to be described.

As indicated above, the diameters of the discs 60 are longer than those of the sleeves 50 and the electrical conductors 2. An equivalent resistance can be associated with a joint, or generally with any mechanical or electrical discontinuity in the path of current flow. The equivalent resistance behaves as a series resistance in the path of the current flow and its value is a function of both the geometry and nature of the connection of the free surfaces of the discs 60 which make contact with one another and create an obstacle to current flow. The resistance of the joint varies inversely with the square of the diameter of the discs 60. As current passes through the joint it passes through the equivalent resistance and a certain amount of power is dissipated in the equivalent resistance. The amount of power dissipated in the resistance is proportional to the square of the current and proportional to the value of the resistance. This dissipated power generates heat in the equivalent resistance, and therefore, also locally in the vicinity of the joint. To minimize the amount of generated heat, an electrical joint having a very low equivalent resistance is desirable. The tolerable amount of expansion due to temperature buildup at the joint, determines, within practical limits, the diameter of the discs. Besides the disc area, the following also tend to decrease equivalent resistance polishing the contacting free surfaces 61, applying greater pressure to urge the contacting surfaces into more forceful contact, and, inserting soft, conductive material between the contacting free surfaces 61 of the discs 60 before the discs are forced together.

An insulator 12, preferably made of epoxy resin or of porcelain, is provided on each side of the joint and serves to couple each electrical contact element 6' and 6" to an outer casing 22. Each insulator is cylindrically shaped and hollow. On one end of each insulator, there is formed an inner lip 19 which extends inwardly from the inside surface of the insulator. Similar outer lips 24 are formed on the outside surfaces of the insulators 12 at their other end. The lips 19 and 24 provide clamping surfaces for clamping arrangements to be described, so that longitudinal forces can be transmitted along the axis of the insulators. By so gripping the projections 19 and 24 on each end of the insulators 12, mechanical stresses created by heating at the joint are transmitted to the outer casing 22. The outer casing 22 contains the insulators 12, the contact elements 6 the ring assembly 10 and all other associate components of the joint. In the central vicinity of the stop joint, the ends of the insulators 12 are locked or clamped to associate contact elements 6 via the inner lips 19. This is accomplished by means of flanges 6a and 6b which are forced in the direction of the respective discs 60 by screws 40, so that they clamp and lock the inner lips 19 between themselves and their respective discs 60. In a similar manner the outer lip 24 on the other ends of each insulator 12, is clamped between an outer casing flange 21 and a bushing 23. The joint assembly 80 is thus rigidly connected to the casing 22 through insulator means which act to transmit and absorb the mechanical stresses which result from expansion and contraction of the cables during heating and cooling thereof.

Gaskets 26 are provided between the insulators 12 and their associated electrical contact elements 6 and the joint flanges 6a—6b to insure that any oil which impregnates the vicinity of the joint does not come into contact with the conductive portions thereof, mainly the free surfaces 61 of the discs 60. Such contact would reduce the effectiveness of the joint by increasing the equivalent resistance and, therefore, also the amount of heat generation.

As best shown in FIG. 2, a pair of electrode 11, having lips 16, are positioned specularly opposite one another with respect to the plane of symmetry A—A' of the joint around the outer circumference of the ring 10 and are partially imbedded in the insulators 12. THe electrodes 11 form a screen for the electrical contact elements 6 to minimize electrical stresses in the insulator 12 due to high voltage gradients in the vicinity of the electrical contact elements 6 and the ring 10. By distributing the electrical potential variations over a larger area, the danger of very large voltage gradients occurring in this vicinity is reduced as is the danger of electrical breakdown in the insulators 12. The electrodes 11 are preferably made of aluminum, but any conductive or semiconductive material can be used. Screening means 17, as shown in FIG. 2, are provided to impart the voltage potential of the ring 10 to the electrodes 11 and, therefore, distribute the voltage concentrations near the ring 10 over the increased area of the electrodes. The screening means 17 comprises a metallic tape of sufficient width to bridge the outside periphery of ring 10 and to make contact with lips 16 on the electrodes 11. Also, as shown in FIG. 2, a leaf spring 82 is interposed between the ring 10 and the electrodes 11 to provide a voltage connection between the two.

In order to linearize or smoothen the area above the screening means 17, carbon paper 18 is applied around the ring 10 over the screening means 17. The carbon paper 18 is built up to a sufficient height to allow a subsequent winding of paper insulation 13 without creating irregularities in the vicinity of the central region of the ring 10. The paper insulation 13, which may be of the same type as used for the outer paper insulators 5, is wound around the whole joint assembly 70 as well as around insulators 12. Thus, the insulation 13 extends almost over the entire length of outer casing 22 and can be tapered, with successive layers, as shown in FIG. 1. The paper insulation 13 is preferably wound to a sufficient height to extend up to the inside surface of casing 22, leaving a small amount of clearance to permit the removal of the casing. Such a layer of paper insulation 13, reinforces the joint and reduces the amount of mechanical stresses exerted by ring 10 on protruberances 7—7'. Such stresses are caused by movement of cables off from their axis.

Further electrodes 15 are situated at each end of the casing 22 in the vicinity of the outer lips 24 of the insulators 12. The electrodes 15 are embedded in associated insulators 25, which are generally cylindrical in shape and are preferably made of epoxy resin. The electrodes are preferably made of aluminum, but any conductive or semiconductive material can be used. The electrodes 15 serve to create an equipotential surface at the point of entry of the cables 1 into the casing 22. The electrodes 15 also reinforce tapered intermediate insulators 25 against inward, radial compressive forces which would tend to damage paper insulators 5.

In FIG. 2, some of the elements described above are shown in a blown-up fragmentary section of the joint assembly 80. In addition, FIG. 2 shows the details of the construction and assembly of a third pair of electrodes 14. These last mentioned electrodes also serve as electrical screens to distribute what would otherwise be very high local voltage concentrations in the vicinity of sleeves 50. As explained with reference to the electrodes 11, such high voltage concentrations could result in damage to the surrounding insulators, in this case, the insulators 3 and 5. The electrodes 14 screen the two terminals of the conductors 2 and are imbedded in insulators 20. The electrodes 14 are preferably made of aluminum, but any conductive or semiconductive material can be used. The insulators 20 are generally cylindrical in shape and are preferably made of epoxy resin. They extend, along with the electrodes 14 in a direction generally axially from the flanges 6a and 6b to a point well beyond sleeves 50. The electrodes 14 are connected to their respective sleeves 50 so that the electrical potential of each of the electrodes 14 is impressed with the potential of its associated sleeve 50. As can be seen in FIG. 4, this is accomplished by bolts 30 which pass through and make contact with the electrode 14, thereby providing good mechanical and electrical coupling between the sleeves 50 and the electrodes 14.

As can be seen in FIG. 2, the gasket 26, which is made of a deformable substance such as rubber or plastic, is placed at a point where the inner lip 19 of the insulator 12 is gripper by the flange 6a and the disc 60. The shape of the gasket 16 is determined by the space between the contacting surfaces of these elements and, under the pressure exerted by these surfaces, the gasket 16 seals this space against penetration of liquids, such as oil, onto the conducting surfaces.

The construction of the ring 10 is best seen in FIG. 3. As shown, the ring 10 is made up of four sectors 90. Each sector is formed with means for engagement with adjacent sectors. Such means are shown in FIG. 3 as consisting of bolts 70 which pass through one of two drilled holes in each sector. A first hole 71 in one sector is not threaded and is adapted to accommodate the head and neck of one of the bolts 70. A second drilled hole, 72, is threaded and is adapted to accommodate the threaded portion of the bolt 70. By aligning the holes 71 and 72 on adjacent sectors 80 and then inserting a bolt 70 into hole 71, screwing said bolt into hole 72 and tightening the bolt, the adjacent sectors are brought together to form part of the circumference of the ring 10. This arrangement allows easy adjustment for the tightening or the loosening of the ring. With this arrangement, it is possible to loosen one or more sectors at a time and, therefore, to speed up and facilitate the making or the disengagement of the joint.

In the cross-sectional view of FIG. 4, three bolts 30 are shown evenly distributed about the electrical contact elements 6' and 6''. Three such boltas are sufficient to impart the electrical potential of elements 6' and 6'' to the screens 14. By placing the screws uniformly around the circumferences of the elements 6' and 6'', the mechanical stresses in insulators 20 are minimized.

Having described the invention with reference to the presently preferred embodiment thereof, it will be appreciated by those skilled in the art that various changes may be made in the construction thereof without departing from the basic concept of the invention and its true spirit as defined in the appended claims.

What is claimed is:

1. A stop joint locking together the ends of electrical conductors of high and very high voltage oil-filled electrical cables so that the conductors are rigidly connected at their ends to a cable casing, said joint having an axis which passes through the centers of the conductor ends and also having a transversal plane of symmetry passing through the center of the joint in a direction perpendicular to the joint axis, said joint comprising: two electrical contact elements specularly shaped with respect to the plane of symmetry of the joint, the contact elements comprising circular discs, having first and second surfaces, said first surfaces being in contact and lying in the plane of symmetry of the joint, and sleeves projecting from the second surfaces along the axis of the joint, said sleeves being rigidly connected to the ends of the conductors, each of said discs having specularly shaped protruberances around its periphery and defining an annular projection along the outer two periphery of the discs; a ring extending along the outer periphery of the discs comprising a plurality of sectors and having adjusting means rigidly securing adjacent sectors to one another, said ring having a groove on its inner surface of the same configuration as the annular projection and receiving said projection intimately inside the groove, said ring securing and rigidly locking said contact elements together by urging together and aligning the two protruberances; two restraining insulators having inner lips on a first end and outer lips on a second end and extending from the vicinity of the contact elements to points adjacent to the casing, means rigidly securing the inner lips on the first ends of said insulators to said electrical contact elements, means rigidly securing the outer lips on the second ends of the insulators to the casing; at least two pairs of electrodes, the electrodes of the first pair being positioned respectively at each end of the conductors and being electrically connected thereto, and the electrodes of the second pair being positioned respectively on each side of the ring and being electrically connected thereto.

2. A stop joint as defined in claim 1, wherein said ring comprises at least four sectors.

3. A stop joint as defined in claim 1, wherein the protruberances are frustoconical shaped with their respective bases coplanar with the first surfaces of their respective discs.

4. A stop joint as defined in claim 1, further comprising a layer of metallic tape on the periphery of said ring bridging the two electrodes of the second pair screening said ring and electrical contact area, and a layer of carbon paper disposed over said metallic tape layer providing linearity between the pair of electrodes forming the screen.

5. A stop joint as defined in claim 1, wherein the two electrodes of the second pair are maintained at the potential of the ring by means of springs interposed between the ring and the electrodes.

6. A stop joint as defined in claim 1, wherein the restraining insulator consists of two equal parts, specularly disposed with respect to each other, each restraining insulator portion being in contact with said discs and each of the electrodes of the second pair being imbedded in a corresponding restraining insulator and forming the screen for the ring and electrical contacts.

7. A stop joint as defined in claim 1, wherein a sealing gasket is placed in a groove formed by the combination of the discs, the restraining insulators and a pair of joint flanges, to seal said groove from the permeation of oil and thereby prevent said oil from coming into contact with the conductors of said joint.

8. A stop joint as in claim 1, wherein the electrodes of the first pair are embedded in insulators, and wherein means mechanically and electrically couple said electrodes of the first pair to the sleeves of the electrical contact elements whereby to impart a voltage potential on the sleeve to the said electrodes of the first pair.

9. A stop joint as defined in claim 1, wherein the restraining insulator in made of epoxy resin.

10. A stop joint as defined in claim 1, wherein said restraining insulator is made of porcelain.

11. A stop joint as defined in claim 1, wherein outer lips of the two restraining insulators are clamped between casing flanges and bushings secured to the casing flanges.

12. A stop joint as defined in claim 1, wherein inner lips of the two restraining insulators are clamped between the discs and a pair of joint flanges urged against said discs by means of screws.

13. A stop joint locking together ends of electrical conductors of high and very high voltage oil-filled electrical cables so that the conductors are rigidly connected at their ends to an outer casing covering the cable insulation, said joint having an axis which passes through the centers of the conductor ends and also having a transversal plane of symmetry passing through the center of the joint in a direction perpendicular to the joint axis, said joint comprising: two electrical contact elements, specularly shaped with respect to the plane of symmetry of the joint, the contact elements comprising circular discs, having first and second surfaces, said first surfaces contacting each other in the plane of symmetry of the joint, and sleeves projecting from the second surfaces along the axis of the joint, said sleeves being rigidly connected to the ends of the conductors, conductive means disposed about the peripheries of said discs and mechanically clamping said discs together, a pair of rigid, tubularly shaped, restraining insulators surrounding the cable insulation on each side of the plane of symmetry and extending from the vicinity of the contact elements to points adjacent to the casing, means rigidly securing one end of each insulator to said electrical contact elements and means rigidly securing the other end of each insulator to the cable casing.

14. A stop joint as defined in claim 1, which further comprises at least two pairs of electrodes, the electrodes of first pair being positioned respectively at each end of the conductors and being electrically connected thereto, and the electrodes of the second pair being positioned respectively at each side of the means clamping the discs together and being electrically connected thereto.

* * * * *

UNITED STATES PATENT OFFICE
CERTIFICATE OF CORRECTION

Patent No. 3,622,682　　　　　Dated　November 23, 1971

Inventor(s)　Vittorio Buroni

It is certified that error appears in the above-identified patent and that said Letters Patent are hereby corrected as shown below:

Column 1, line 52, "in" should read -- is -- . Column 3, line 22, "longer" should read -- larger -- ; line 45, insert a colon after "resistance". Column 5, line 17, "gripper" should read -- gripped -- ; line 43, "boltas" should read -- bolts -- . Column 8, line 2, "1" should read -- 13 -- .

Signed and sealed this 17th day of October 1972.

(SEAL)
Attest:

EDWARD M. FLETCHER, JR.　　　　　ROBERT GOTTSCHALK
Attesting Officer　　　　　　　　Commissioner of Patents